(12) United States Patent
Midgley

(10) Patent No.: US 11,636,228 B2
(45) Date of Patent: *Apr. 25, 2023

(54) POLICY BASED PERSISTENCE

(71) Applicant: CITRIX SYSTEMS, INC., Fort Lauderdale, FL (US)

(72) Inventor: Christopher W. Midgley, Northborough, MA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 220 days.

This patent is subject to a terminal disclaimer.

(21) Appl. No.: 17/160,567

(22) Filed: Jan. 28, 2021

(65) Prior Publication Data

US 2021/0150075 A1    May 20, 2021

Related U.S. Application Data

(63) Continuation of application No. 15/718,270, filed on Sep. 28, 2017, now Pat. No. 10,909,271.

(51) Int. Cl.
| | |
|---|---|
| *G06F 21/78* | (2013.01) |
| *G06F 9/4401* | (2018.01) |
| *G06F 9/445* | (2018.01) |
| *G06F 8/61* | (2018.01) |

(52) U.S. Cl.
CPC ............ *G06F 21/78* (2013.01); *G06F 9/4401* (2013.01); *G06F 9/4406* (2013.01); *G06F 9/44505* (2013.01); *G06F 8/63* (2013.01); *G06F 2221/2141* (2013.01)

(58) Field of Classification Search
CPC ...... G06F 21/78; G06F 9/4401; G06F 9/4406; G06F 9/44505; G06F 8/63; G06F 2221/2141; G06F 9/4451
See application file for complete search history.

(56) References Cited

U.S. PATENT DOCUMENTS

| | | |
|---|---|---|
| 2002/0057803 A1 | 5/2002 | Loos et al. |
| 2003/0229761 A1 | 12/2003 | Basu et al. |
| 2009/0049234 A1 | 2/2009 | Oh et al. |
| 2011/0061045 A1* | 3/2011 | Phillips ............... G06F 9/45541 718/1 |
| 2013/0086579 A1 | 4/2013 | Venkat et al. |
| 2013/0086585 A1 | 4/2013 | Huang et al. |
| 2013/0198748 A1 | 8/2013 | Sharp et al. |
| 2014/0136752 A1 | 5/2014 | Terada |
| 2014/0188947 A1* | 7/2014 | Morris ................. G06F 3/0653 707/812 |
| 2015/0121024 A1 | 4/2015 | Kolvick et al. |

(Continued)

FOREIGN PATENT DOCUMENTS

| | | |
|---|---|---|
| GB | 2476878 A | 7/2011 |
| JP | 2002229911 | 8/2002 |

*Primary Examiner* — Joseph P Hirl
*Assistant Examiner* — Thomas A Gyorfi

(57) ABSTRACT

A computing device includes a memory and at least one processor configured to cooperate with the memory. The processor is to boot the computing device, and direct generated data to data storage. The data storage includes at least one persistent layer and a non-persistent layer. The processor determines if the data is to be stored in the at least one persistent layer or the non-persistent layer based on a version of the operating system being used to boot the computing device.

19 Claims, 4 Drawing Sheets

(56) References Cited

U.S. PATENT DOCUMENTS

| | | |
|---|---|---|
| 2015/0186045 A1 | 7/2015 | Boyle et al. |
| 2015/0186046 A1* | 7/2015 | Benton ................ G06F 12/121 |
| | | 711/103 |
| 2015/0186047 A1* | 7/2015 | Shank ................. G06F 12/121 |
| | | 711/104 |
| 2015/0365361 A1 | 12/2015 | Tomlinson et al. |
| 2016/0055016 A1 | 2/2016 | Beveridge |
| 2016/0191499 A1 | 6/2016 | Momchilov et al. |
| 2016/0359684 A1 | 12/2016 | Rizqi et al. |
| 2017/0169072 A1 | 6/2017 | Crawford |
| 2017/0228406 A1* | 8/2017 | Morris ................ G06F 16/2228 |

\* cited by examiner

POLICY BASED PERSISTENCE

RELATED APPLICATIONS

This application is a continuation of U.S. application Ser. No. 15/718,270 filed Sep. 28, 2017, which is hereby incorporated herein in its entirety by reference.

TECHNICAL FIELD

The present disclosure relates to the field of computing devices, and more particularly, to application of policy rules to the storage and organization of data in a user's workspace.

BACKGROUND

In terms of storage in a computing device, there are commonly two types of workspaces, persistent and non-persistent. A persistent workspace is where information a user or application changes is retained between sessions. A non-persistent workspace is where information the user or application changes is not retained between sessions.

A persistent workspace can deliver a great user experience, but management can be expensive dealing with application issues such as DLL hell and accidental configuration failures. In computing, DLL Hell is a term for the complications that arise when working with dynamic link libraries (DLLs). The problem arises when the version of the DLL on the computer is different than the version that was used when the program was being created, and DLLs have no in-built mechanism for backward compatibility.

A non-persistent workspace is low cost to operate, but is often challenging to operate due to the lack of persisting information. Commonly, a profile manager is used to protect specific information (based on policies), such as documents and registry keys. But these policy approaches come with overhead, such as copying or streaming information which can be slow, or present compatibility issues with applications.

Additionally, managing policy for profiles is complex as there is a tight relationship between policy management for profiles and applications being used by users. However, these are managed through multiple policy engines resulting in unexpected management challenges.

Layering has created a model where all information can be persisted for a user or workspace on top of a non-persistent workspace. This has the benefits of managing a common pool of workspaces, while still providing a persistent workspace experience. However, this model persists everything that happens in the workspace, which can create management challenges as unwanted configuration changes, application and DLL corruption, and even viruses can persist across the usage of the workspace.

Applications often define the requirements for persistence, and policy should be associated with the applications in use. For example, if a user is assigned Office 365, then the Outlook OST file and the system search index should be persisted to ensure the user has a good experience without performance challenges. But this is not possible with a standard profile manager because the objects are very large (OST files in this case) or the information is deep into the system integration (search index in this case).

Layering further exacerbates this problem because a much larger number of use cases can be delivered from a single silo/gold image. Elastic layering may extend application layering by allowing layers to be attached to user sessions (such as by session ID and user ID) on-demand. Consequently, elastic layering can deliver applications based on user identity rather than simply based on assigned image. This makes managing the policy for persistence even harder because administrators need to make sure to adjust profile policy every time they change application assignments. This is sometimes not obvious because of Active Directory group memberships.

Finally, some application use cases require that persistence of information not be defined by specific rules such as specific directories or registry keys, but instead based on the application usage itself. For example, a developer use case may have applications and DLL files being written to storage. Those need to persist, even if they are being stored in system directories or places unknown to an administrator. However, if a virus is executed on the machine, any changes made by the virus process should not persist. In these cases, simple file and key rules do not suffice.

SUMMARY

A computing device includes a memory and at least one processor configured to cooperate with the memory. The processor is to boot the computing device, and direct generated data to data storage. The data storage includes at least one persistent layer and a non-persistent layer. The processor determines if the data is to be stored in the at least one persistent layer or the non-persistent layer based on a version of the operating system being used to boot the computing device.

Each version of the operating system may have their own set of persistent and non-persistent layers associated therewith.

The generated data may comprise different types of data, with each type of data further having a storage policy associated therewith. Application-specific type data may be stored in the at least one persistent layer, and non-application-specific type data may be stored in the non-persistent layer.

The data may be generated by different users, with the data further having a storage policy based on an identity of the user. Each respective user has their own set of persistent and non-persistent layers. The different users may include a first user and a second user, with the data generated by the first user being stored in the at least one persistent layer, and with the data generated by the second user being stored in the non-persistent layer.

At least one application may be assigned to a user of the computing device, with the at least one application having a storage policy associated therewith. Data generated by the at least one assigned application may be stored in the at least one persistent layer, and data generated by a non-assigned application may be stored in the non-persistent layer.

Another aspect is directed to a method including booting the computing device, and directing generated data to data storage. The data storage comprises at least one persistent layer and a non-persistent layer. The method further includes determining if the data is to be stored in the at least one persistent layer or the non-persistent layer based on a version of the operating system being used to boot the computing device.

Yet another aspect is directed to a non-transitory computer readable medium for a computing device, with the non-transitory computer readable medium having a plurality of computer executable instructions for causing the computing device to perform steps as described above.

DETAILED DESCRIPTION

Figure 1:
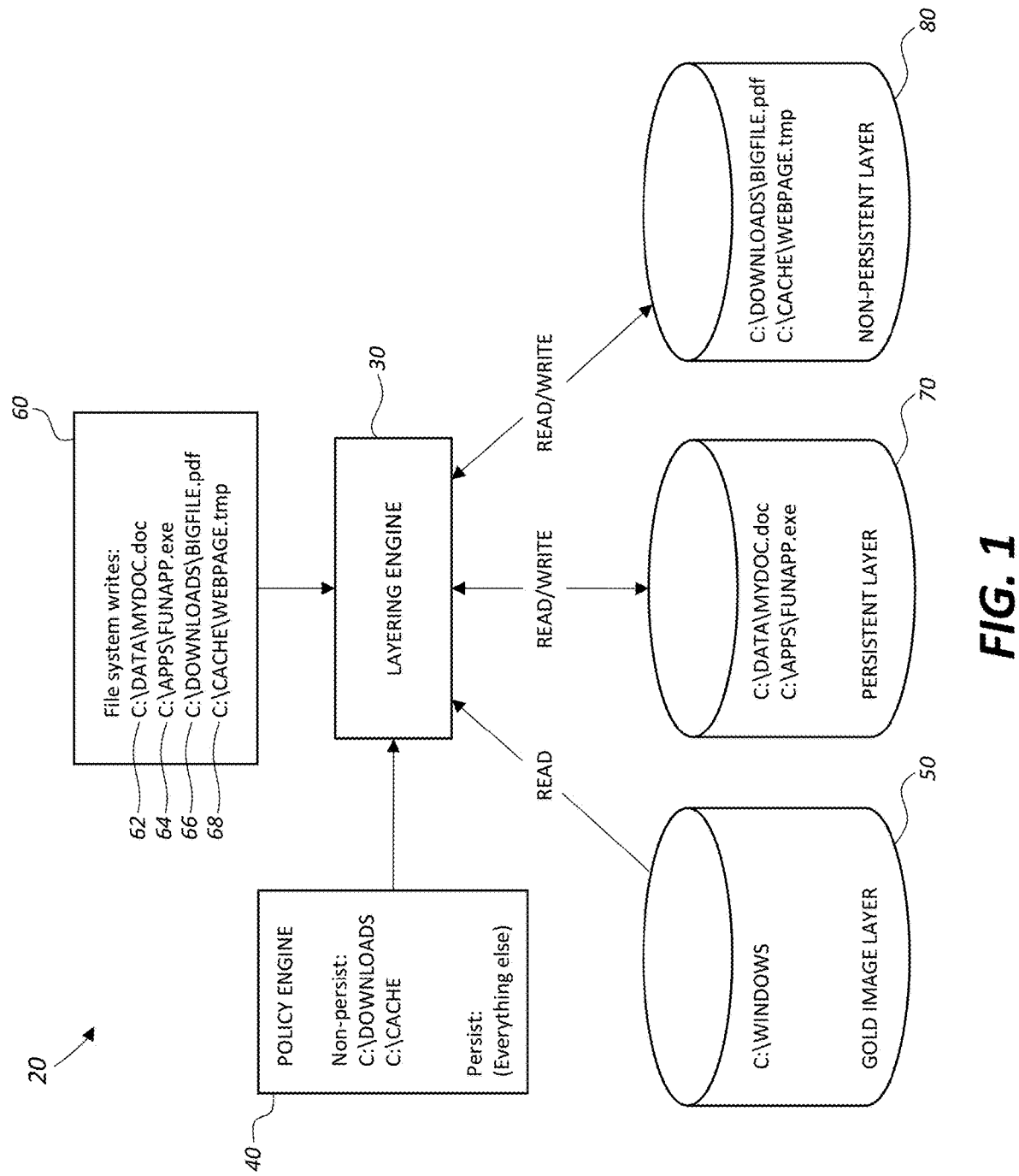
FIG. 1 illustrates the storage and organization of data to persistent layering or non-persistent layering based on file system policy rules in accordance with the present disclosure.

The present disclosure will now be described more fully hereinafter with reference to the accompanying drawings, in which exemplary embodiments are shown. This disclosure may, however, be embodied in many different forms and should not be construed as limited to the embodiments set forth herein. Rather, these embodiments are provided so that this disclosure will be thorough and complete. Like numbers refer to like elements throughout.

When a virtual hard drive is delivered to a computing device, e.g., a server or desktop, it may be referred to as a virtual read only. The virtual hard drive may be a virtual read only in the sense that the original image is read only but when the virtual hard drive is delivered to a server or desktop it becomes read/write as the operating system needs to be able to persist information. When the machine is restarted, the image is reverted back to its original state. The virtual hard drive may be implemented as a read-only image plus a writable section that captures just the changes.

The virtual hard drive includes, as a minimum, an operating system, and may also include one or more applications and data. The virtual hard drive may be referred to as a base image layer or a gold image layer, and is a single copy that may be shared by hundreds or even thousands of users.

Since the virtual hard drive may be a virtual read only, this insures that there is no cross-pollination among all of the users sharing the same virtual hard drive. If any changes or patches are needed to the gold image, then an IT administrator creates a new version.

The virtual hard drive may be a layered image. A layered image means a single disk that has been composited with multiple application layers. A layered image may contain the minimum amount of information needed for an operating system to boot. While the layered image may contain many other applications delivered via composited layers, it is also possible for additional layers to be attached at a time once the operating system layer is booting or booted.

Once a user's computing device has booted up and is operating off of the gold image layer, any information a user or an application changes may need to be retained between sessions. This information is to be saved or persisted. This is done at the user layer, which is writable. The user layer may also be referred to as a personalization layer, a persistent layer or even a writable layer.

The user layer may be per-user, meaning that a single computing device may support multiple users (such as the Citrix XenApp server, known as sessions). In other words, multiple persistent user layers may be used. There is also a machine layer, like the user layer, but can persist machine specific information independent of specific users.

The user layer is where user-specific data is saved. Currently, the user layer is a catch-all for anything and everything that changes on a desktop or server. This is the persistence of the computing device. Any changes made in the file system are stored in the user layer.

The user layer is unique to the user, and is generally stored in a shared file server so that the user layer follows the user on whatever machine the user logs in on. Next time the user logs in, the physical server running the desktop mounts the user layer just like it mounts the application layers in the gold image layer.

However, and a noted in the background, a fully-persistent desktop is expensive for IT to maintain. Should a user download a virus, for example, then that virus is saved in the user layer. Should a user download an application that corrupts the desktop, then that application is also saved in the user layer. Next time the user logs in, the virus and corrupted application remain on the desktop.

On the other end of the spectrum is a fully non-persistent desktop. Every time a user logs into a non-persistent desktop, the user is presented with a new desktop. Everything is working and the cost for IT is very low. A non-persistent desktop is limiting in that any user and application changes made are not saved between sessions.

To address this problem, a semi-persistent desktop is provided in accordance with the present disclosure. In particular, policy rules are added to the user layer so as to segment and control which information is to be persisted. In a preferred embodiment, a plurality of writable layers are provided for an individual workspace.

There is at least one writable layer that is the persistent layer, and a single writable layer that is the non-persistent layer. Even though there may be more than one non-persistent layer, there is no advantage to having multiple non-persistent layers per user since the data is discarded after the session ends. However, there is an advantage of having more than one persistent layer per user so as to allow more granular control of the data being persisted. Each user may have a non-persistent layer so that on a shared server (session) when the user logs out and logs in again, the non-persistent data for that user is discarded but the non-persistent data for other users continues to persistent for the life of their session.

Policy is then used to define rules for determining which information or data is to be written to the persistent and non-persistent layers. The rules may be file system policy rules, user policy rules, or dynamically constructed policy rules. When a workspace session is complete, the non-persistent layer is discarded and all persistent layers are retained.

Referring now to FIG. 1, the storage and organization of data to persistent layering or non-persistent layering based on file system policy rules will be discussed. The illustrated computing system 20 includes a layering engine 30, and a policy engine 40 associated with the layering engine.

As the computing device 20 is booted up from the virtual read-only gold image layer 50, the layering and policy engines 30, 40 are running. The layering engine 30 is configured to direct workspace data 60 to data storage, with the data storage comprising at least one persistent layer 70 and a non-persistent layer 80. In this example, there is one persistent layer 70.

The policy engine 40 cooperates with the layering image 30 and is configured to determine if the workspace data 60 is to be stored in the persistent layer 70 or the non-persistent layer 80 based on a storage policy. The storage policy in this example is based on file system policy rules.

The illustrated workspace data 60 includes a number of different file system writes. The file system writes include a document MYDOC.doc 62 being written to a DATA folder, an application FUNAPP.exe 64 being written to an APPS folder, a download BIGFILE.pdf 66 being written to a DOWNLOADS folder, and a web page WEBPAGE.html 68 being written to a CACHE folder. The policy engine 40 instructs the layering engine 30 to store file writes MYDOC.doc 62 and FUNAPP.exe 64 to the persistent layer 70. For file writes BIGFILE.pdf 66 and WEBPAGE.html 68, the policy engine 40 instructs the layering engine 30 to store these file writes in the non-persistent layer 80. When the workspace session is complete, the non-persistent layer 80 is discarded and the persistent layer 70 may be retained.

The policy engine 40 is directed to removing security risks and support risks by discarding file system writes 66, 68 when the session ends. However, productivity of the computing device 20 is maintained because file system writes 62, 64 are saved in the persistent layer 70 so that the next time the user logs in, these file system writes are available to the user.

The layering engine 30 and the policy engine 40 are part of the operating system within the gold image layer 50. In particular, the layering engine 30 and the policy engine 40 are in a file system and registry.

The concept of a semi-persistent desktop in accordance with the disclosure does not care about the managed machine or the type of virtualization that the managed machine is using, whether physical or virtual. This concept is about modifying the behavior of the operating system in order to save different information based on a variety of rules into multiple user layers. This concept advantageously provides more granular control, improves security, and reduces IT cost.

When the layering engine 30 sees a file system or registry request, it can qualify the request based on the policy engine 40 and determine which writable layer the information should be written to. The layering engine 30 can then, upon information being opened on subsequent requests, direct the I/O to the appropriate layer (persistent 70 or non-persistent 80). In this way, the policy of the policy engine 40 controls which layer the information is stored in. When a session has expired, the non-persistent layer 80 is discarded while the persistent layer 70 is retained for a future session.

Figure 2:
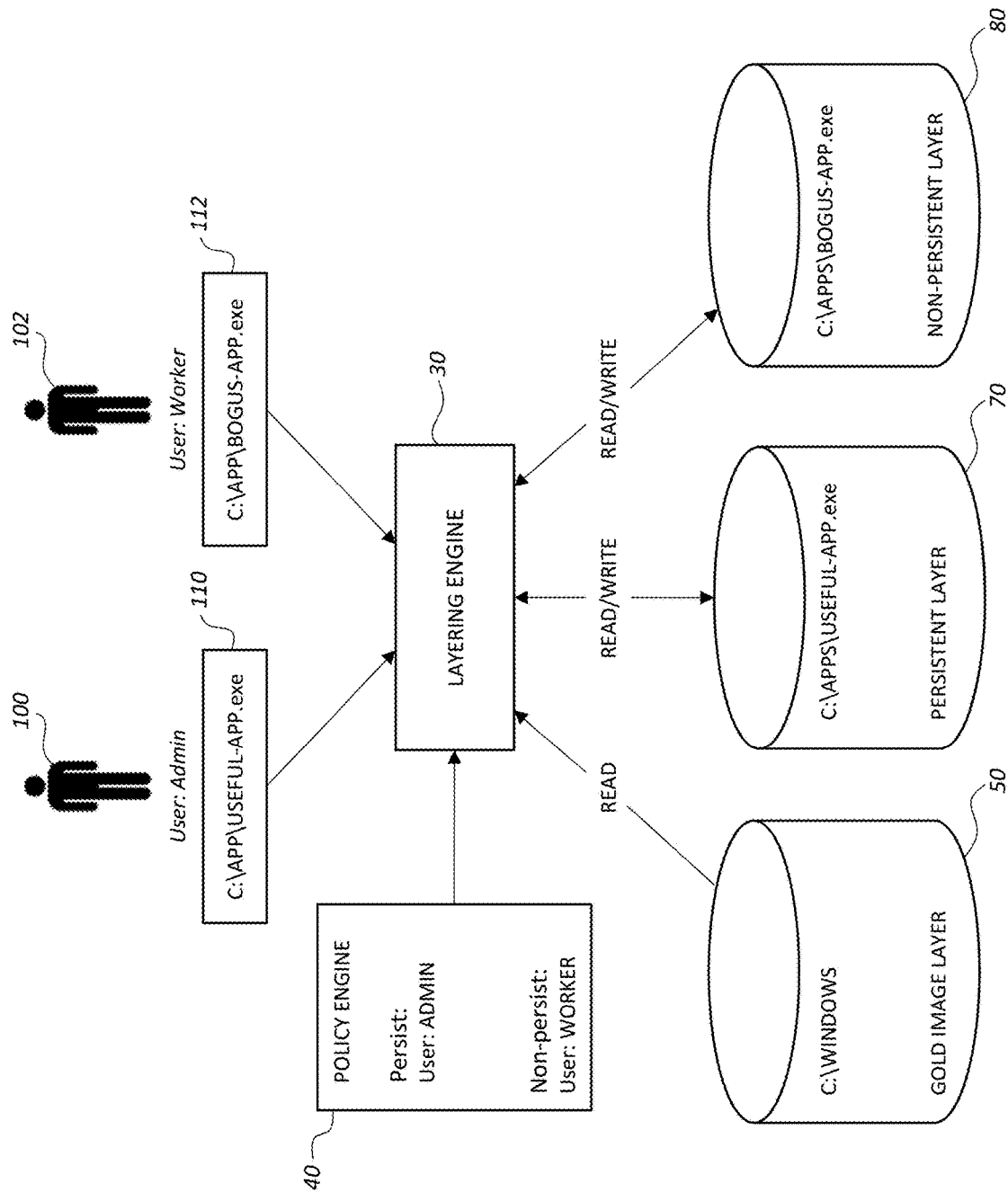
FIG. 2 illustrates the storage and organization of data to persistent layering or non-persistent layering based on user based policy rules in accordance with the present disclosure.

Referring now to FIG. 2, the policy engine 40 will be discussed in terms of a user based policy. A user based policy directs workspace data to the persistent layer 70 or to the non-persistent layer 80 based on an identity of the user.

In the illustrated example, there are two users. One user is the IT administrator 100 and the other user is a worker 102. The policy engine 40 instructs the layering engine 30 that anything the IT administrator 100 changes is to be directed to the persistent layer 70. In contrast, the policy engine 40 instructs the layering engine 30 that anything the worker 102 downloads is to be directed to the non-persistent layer 80.

As an example, the IT administrator 100 downloads a useful application USEFUL-APP.exe 110, which may be a print driver or a user specific application needed by the worker 102. The policy engine 40 instructs the layering engine 30 to store the USEFUL-APP.exe 110 in the persistent layer 70. The worker 102 downloads an application BOGUS-APP.exe 112, which may be a game or even a virus, for example. The policy engine 40 instructs the layering engine 30 to store the BOGUS-APP.exe 112 in the non-persistent layer 80. When the workspace session is complete, the BOGUS-APP.exe 112 in the non-persistent layer 80 is discarded and the USEFUL-APP.exe 110 in the persistent layer 70 is retained.

Figure 3:
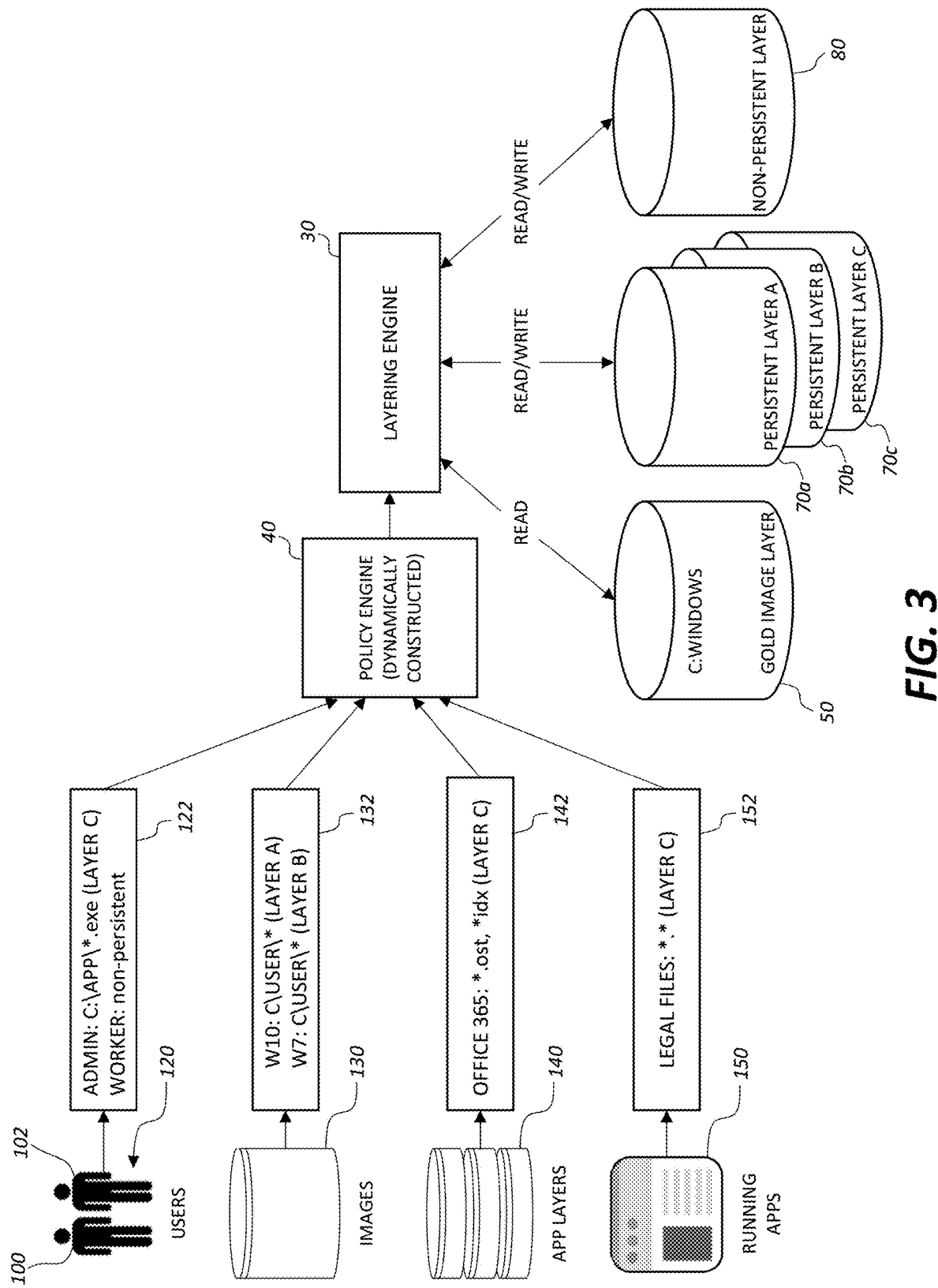
FIG. 3 illustrates the storage and organization of data to persistent layering or non-persistent layering based on dynamically constructed policy rules in accordance with the present disclosure.

Referring now to FIG. 3, the policy engine 40 will be discussed in terms of a dynamically constructed policy. This illustration goes into more depth about the different types of rules that can be used by the policy engine 40. A combination of the file system policy rules and the user based policy rules may be applied. In the illustrated example, the dynamically constructed policy engine 40 is based on a combination of sources such as logged in user identity 120, images in use 130, application layers assigned 140, and applications being executed 150.

The logged in user identity input 120 to the policy engine 40 is as discussed above. One user is the IT administrator 100 and the other user is a worker 102. The policy engine 40 instructs the layering engine 30 that anything the IT administrator 100 downloads is to be directed to persistent layer C, as indicated by reference 70c and as indicated in box 122. The policy engine 40 instructs the layering engine 30 that anything the worker 102 downloads is to be directed to the non-persistent layer 80 as also indicated in box 122. For example, any file writes initiated by the IT administrator 100 ending in ".exe" are stored in persistent layer C 70c.

Another input to the policy engine 40 is based on images 130. Images 130 is a variant of the user based rules. This policy is applied not based on users but based on which gold image layer 50 is being applied. If the user is using Windows 10™ then a certain set of policy rules are to apply as indicated in box 132. If the user is using Windows 7™ then a different set of policy rules are to apply as also indicated in box 132.

The policy engine 40 may thus be based on a real world action, such as a user logging in or which gold image layer the desktop is booted on. In the illustrated example, any changes made while the desktop is operating with Windows 10™ will be stored in persistent layer A, as indicated by reference 70a. Any changes made while the desktop is operating with Windows 7™ will be stored in persistent layer B, as indicated by reference 70b.

Another input to the policy engine 40 is based on application layers assigned 140. For applications not assigned to the user, then any changes made will not be persisted. However, for an application that is assigned to the user, such as Microsoft Office 365™, and in particular Outlook, then the user's mail file is to be persisted. The mail file is to be stored in persistent layer C 70c as indicated in box 142. This aspect of the policy engine 40 is to simplify policy so the IT administrator does not have to declare on a per user basis the policy, but instead, based on the layers and actions already specified to the user.

Yet another input to the policy engine 40 is based on applications being executed 150. If an assigned application is running and is causing the I/O, then a certain set of policy rules are to apply.

For example, if the user is using a legal document management application, such as Legal Files™ as indicated in box 152, then any file writes from this application will be stored in persistent layer C 70c. However, if the user downloads something else and puts it on top of or in the same storage folder as the legal document management system, then this download will be stored in the non-persistent layer 80. With this set of policy rules, file writes are to persist only when written by the legal document management system.

Multiple persistent layers advantageously provide a sub-granular level of control. The policy defines which persistent layer is to receive the information, thereby segregating data between full persistence, application-specific persistence and non-persistence, for example. This has the benefit of making it possible to repair a workspace by discarding the generic persistence, while retaining the application-specific persistence.

In addition, persistence that is managed though policy is much more portable across operating systems since limited registry key and system information are retained. This makes it possible for the different layers to be migrated between platforms, such as XenApp™ to XenDesktop™, or Microsoft Windows 7™ to Microsoft Windows 10™, for example.

More particularly, policy can advantageously be defined with inclusion and exclusion rules, covering all persistent objects (files, directories, registry keys, registry hives, etc.), for example. As illustrated above, policy could also include application process trees (to know when a particular application is writing the information).

As illustrated above, policy can also define the user of the information, by user identity and/or user rights as well as system identity and system processes. For example, an administrator layer could be defined so that when an administrator logs into a machine, their changes persist (for example, adding a print driver) but user changes remain non-persistent. Additionally, if a user uses fast user switching (a feature in MSFT Windows™ which allows multiple users to be logged in at the same time, but switch between users), the correct writable layer can be selected as the user fast switches.

Policy can further be global, based on the user's identity (such as active directory group membership), or based on applications that the user has access to. Application policy can be associated with application layers and operating system images (in a layering system), such that when a user is assigned rights to use an application, the persistent policies are automatically updated. This can work on both layered images (OS images) as well as elastic layers with applications.

Policy does not have to be static, but can be dynamic with either wildcards (such as %USERNAME% or *.*) or with an API that enables application-specific logic (associated with an application layer, for example) to execute to programmatically lookup the correct policy. For example, using an API could determine exactly which files need to be protected with registry key lookups or calling APIs of a third party product.

Figure 4:
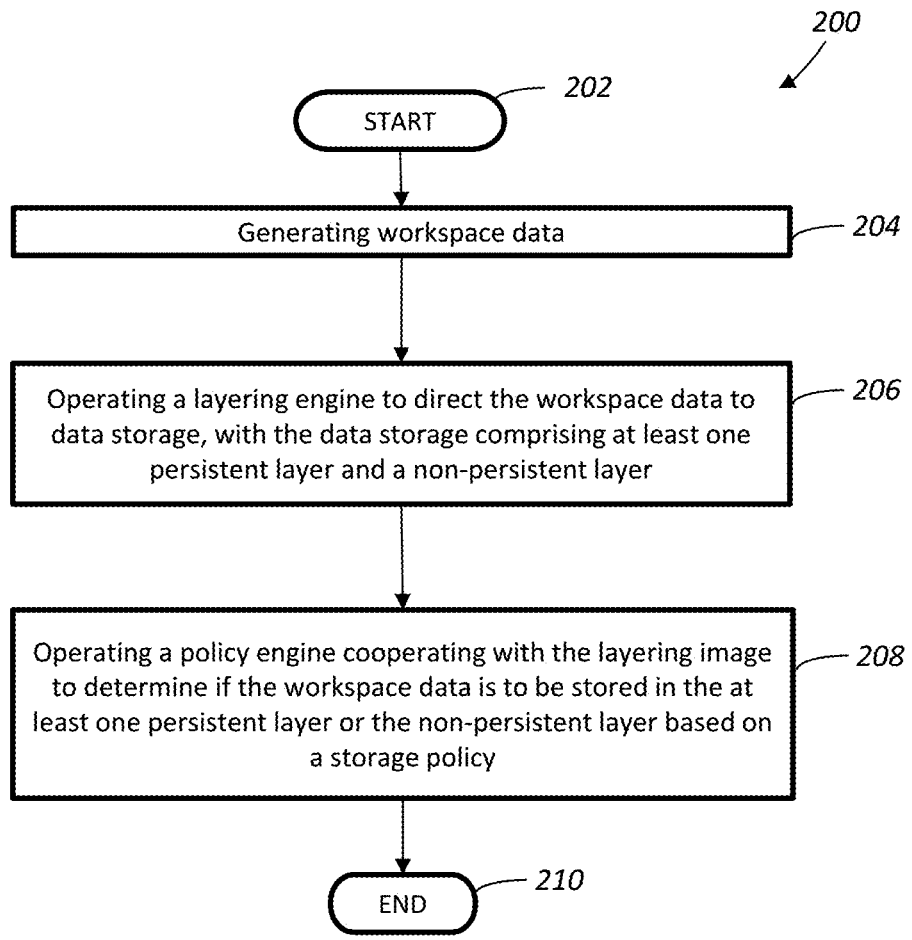
FIG. 4 is a flowchart illustrating a method for operating a computing device that includes a layering engine and a policy engine in accordance with the disclosure.

Referring now to the flowchart 200 in FIG. 4, another aspect of the disclosure is directed to a method for operating a computing device 20 as described above. In particular, from the start (Bock 202), the method includes generating workspace data at Block 204, and operating a layering engine 30 to direct the workspace data to data storage. The data storage includes at least one persistent layer 70 and a non-persistent layer 80. The method further includes operating a policy engine 40 cooperating with the layering image 30 at Block 208 to determine if the workspace data is to be stored in the at least one persistent layer 70 or the non-persistent layer 80 based on a storage policy. The method ends at Block 210.

Yet another aspect is directed to a non-transitory computer readable memory for a computing device 20, with the non-transitory computer readable medium having a plurality of computer executable instructions for causing the computing device 20 to perform a step of operating a layering engine 30 to direct workspace data to data storage, with the data storage comprising at least one persistent layer 70 and a non-persistent layer 80. The computing device 20 further performs a step of operating a policy engine 40 cooperating with the layering image 30 to determine if the workspace data is to be stored in the at least one persistent layer 70 or the non-persistent layer 80 based on a storage policy.

Many modifications and other embodiments of the invention will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the foregoing description.

That which is claimed:

1. A computing device comprising:
   a memory and at least one processor configured to cooperate with said memory to perform the following:
   boot the computing device,
   direct generated data to data storage, with the data storage comprising at least one persistent layer and a non-persistent layer, and
   determine if the data is to be stored in the at least one persistent layer or the non-persistent layer based on a version of the operating system being used to boot the computing device.

2. The computing device according to claim 1 wherein each version of the operating system has their own set of persistent and non-persistent layers associated therewith.

3. The computing device according to claim 1 wherein the generated data comprises different types of data, with each type of data further having a storage policy associated therewith.

4. The computing device according to claim 3 wherein application-specific type data is stored in the at least one persistent layer, and non-application-specific type data is stored in the non-persistent layer.

5. The computing device according to claim 1 wherein the data is generated by different users, with the data further having a storage policy based on an identity of the user, and with each respective user having their own set of persistent and non-persistent layers.

6. The computing device according to claim 5 wherein the different users include a first user and a second user, with the data generated by the first user being stored in the at least one persistent layer, and with the data generated by the second user being stored in the non-persistent layer.

7. The computing device according to claim 1 wherein at least one application is assigned to a user of the computing device, with the at least one application having a storage policy associated therewith.

8. The computing device according to claim 7 wherein data generated by the at least one assigned application is stored in the at least one persistent layer, and data generated by a non-assigned application is stored in the non-persistent layer.

9. A method comprising:
   booting the computing device;
   directing generated data to data storage, with the data storage comprising at least one persistent layer and a non-persistent layer; and
   determining if the data is to be stored in the at least one persistent layer or the non-persistent layer based on a version of the operating system being used to boot the computing device.

10. The method according to claim 9 wherein each version of the operating system has their own set of persistent and non-persistent layers associated therewith.

11. The method according to claim 9 wherein the generated data comprises different types of data, with each type of data further having a storage policy associated therewith.

12. The method according to claim 11 wherein application-specific type data is stored in the at least one persistent layer, and non-application-specific type data is stored in the non-persistent layer.

13. The method according to claim 9 wherein the data is generated by different users, with the data further having a storage policy based on an identity of the user, and with each respective user having their own set of persistent and non-persistent layers.

14. The method according to claim 13 wherein the different users include a first user and a second user, with the data generated by the first user being stored in the at least one persistent layer, and with the data generated by the second user being stored in the non-persistent layer.

15. The method according to claim 9 wherein at least one application is assigned to a user of the computing device, with the at least one application having a storage policy associated therewith.

16. The method according to claim 15 wherein data generated by the at least one assigned application is stored in the at least one persistent layer, and data generated by a non-assigned application is stored in the non-persistent layer.

17. A non-transitory computer readable medium for a computing device, with the non-transitory computer readable medium having a plurality of computer executable instructions for causing the computing device to perform steps comprising:
   booting the computing device;
   directing generated data to data storage, with the data storage comprising at least one persistent layer and a non-persistent layer; and
   determining if the data is to be stored in the at least one persistent layer or the non-persistent layer based on a version of the operating system being used to boot the computing device.

18. The non-transitory computer readable medium according to claim 17 wherein each version of the operating system has their own set of persistent and non-persistent layers associated therewith.

19. The non-transitory computer readable medium according to claim 17 wherein the generated data comprises different types of data, with application-specific type data being stored in the at least one persistent layer, and non-application-specific type data being stored in the non-persistent layer.

* * * * *